United States Patent
Alrasheed et al.

(10) Patent No.: US 10,384,172 B2
(45) Date of Patent: Aug. 20, 2019

(54) COMPOSITE MEMBRANE WITH MULTI-LAYERED ACTIVE LAYER

(71) Applicants: International Business Machines Corporation, Armonk, NY (US); King Abdulaziz City for Science and Technology (KACST), Riyadh (SA)

(72) Inventors: Radwan A. Alrasheed, San Jose, CA (US); Blake W. Davis, Hollister, CA (US); Jacquana T. Diep, San Jose, CA (US); Geraud J. Dubois, Los Altos, CA (US); Young-Hye Na, San Jose, CA (US); Majed S. Nassar, San Jose, CA (US); Ankit Vora, San Jose, CA (US)

(73) Assignees: International Business Machines Corporation, Armonk, NY (US); King Abdulaziz City for Science and Technology (KACST), Riyadh (SA)

( * ) Notice: Subject to any disclaimer, the term of this patent is extended or adjusted under 35 U.S.C. 154(b) by 161 days.

(21) Appl. No.: 15/425,468

(22) Filed: Feb. 6, 2017

(65) Prior Publication Data
US 2017/0144113 A1    May 25, 2017

Related U.S. Application Data

(62) Division of application No. 13/491,506, filed on Jun. 7, 2012, now Pat. No. 9,561,474.

(51) Int. Cl.
*B01D 71/76* (2006.01)
*B01D 61/02* (2006.01)
(Continued)

(52) U.S. Cl.
CPC .......... *B01D 71/76* (2013.01); *B01D 53/228* (2013.01); *B01D 61/025* (2013.01);
(Continued)

(58) Field of Classification Search
CPC .... B01D 71/76; B01D 61/025; B01D 69/125; B01D 69/12; B01D 61/027; B01D 53/228;
(Continued)

(56) References Cited

U.S. PATENT DOCUMENTS

| | | |
|---|---|---|
| 4,039,440 A | 8/1977 | Cadotte |
| 4,277,344 A | 7/1981 | Cadotte |

(Continued)

FOREIGN PATENT DOCUMENTS

| | | |
|---|---|---|
| EP | 0072002 A1 | 2/1983 |
| EP | 0419396 A1 | 3/1991 |

(Continued)

OTHER PUBLICATIONS

Young-Hye, Novel thin film composite membrane containing ionizable hydrophobes: pHdependent reserve osmosis behavior and improved chlorine resistance, Feb. 23, 2010 (Year: 2010).*

(Continued)

*Primary Examiner* — Krishnan S Menon
*Assistant Examiner* — Waqaas Ali
(74) *Attorney, Agent, or Firm* — Shumaker & Sieffert, P.A.

(57) ABSTRACT

A thin film composite membrane includes an active layer on a support membrane, wherein the active layer includes at least two chemically distinct first and second crosslinked polyamide film sub-layers. The first film sub-layer includes a polyamide unit; and the second film sub-layer includes a copolyamide with two chemically distinct polyamide units. The first film sub-layer is closer to the support than is the second film sub-layer.

8 Claims, 6 Drawing Sheets

(51) Int. Cl.
  *B01D 69/12* (2006.01)
  *B01D 53/22* (2006.01)
  *C02F 1/44* (2006.01)
  *B01D 71/56* (2006.01)
  *B01D 69/10* (2006.01)
  *B01D 61/00* (2006.01)

(52) U.S. Cl.
  CPC ............ *B01D 61/027* (2013.01); *B01D 69/10* (2013.01); *B01D 69/12* (2013.01); *B01D 69/125* (2013.01); *B01D 71/56* (2013.01); *C02F 1/441* (2013.01); *C02F 1/442* (2013.01); *B01D 61/002* (2013.01); *B01D 2323/26* (2013.01); *B01D 2323/30* (2013.01)

(58) Field of Classification Search
  CPC .... B01D 69/10; B01D 71/56; B01D 2323/26; B01D 61/002; B01D 2323/30; C02F 1/442; C02F 1/441
  See application file for complete search history.

(56) References Cited

U.S. PATENT DOCUMENTS

| | | | |
|---|---|---|---|
| 4,520,044 | A | 5/1985 | Sundet |
| 4,554,317 | A | 11/1985 | Behar et al. |
| 4,769,148 | A | 9/1988 | Fibiger et al. |
| 4,897,091 | A | 1/1990 | Pasternak et al. |
| 4,914,064 | A | 4/1990 | Schucker |
| 4,931,483 | A | 6/1990 | Matsuoka et al. |
| 5,019,264 | A | 5/1991 | Arthur |
| 5,085,777 | A | 2/1992 | Arthur |
| RE34,115 | E | 10/1992 | Coplan et al. |
| 5,169,719 | A | 12/1992 | Balatan |
| 5,547,575 | A | 8/1996 | Demmer et al. |
| 5,578,688 | A | 11/1996 | Ito et al. |
| 5,674,398 | A | 10/1997 | Hirose et al. |
| 5,693,227 | A | 12/1997 | Costa |
| 5,783,079 | A | 7/1998 | Kumano et al. |
| 6,177,011 | B1 | 1/2001 | Hachisuka et al. |
| 6,280,853 | B1 | 8/2001 | Mickols |
| 6,346,588 | B1 | 2/2002 | Fenchl et al. |
| 6,413,425 | B1 | 7/2002 | Hachisuka et al. |
| 6,632,915 | B1 | 10/2003 | Schwarte et al. |
| 6,821,430 | B2 | 11/2004 | Andou et al. |
| 6,913,694 | B2 | 7/2005 | Koo et al. |
| 7,490,725 | B2 | 2/2009 | Pinnau et al. |
| 7,537,697 | B2 | 5/2009 | Koo et al. |
| 7,585,927 | B2 | 9/2009 | Liu |
| 7,629,434 | B2 | 12/2009 | Saegusa et al. |
| 7,677,398 | B2 | 3/2010 | Belfer et al. |
| 7,815,987 | B2 | 10/2010 | Mickols et al. |
| 8,727,135 | B2 | 5/2014 | Cheng et al. |
| 9,022,227 | B2 | 5/2015 | Na et al. |
| 2003/0077435 | A1 | 4/2003 | Charkoudian et al. |
| 2003/0121857 | A1 | 7/2003 | Kurth et al. |
| 2003/0124357 | A1 | 7/2003 | Kagerer et al. |
| 2003/0192828 | A1 | 10/2003 | Fukutomi et al. |
| 2003/0226799 | A1 | 12/2003 | Charkoudian |
| 2007/0251883 | A1 | 11/2007 | Niu |
| 2008/0035571 | A1 | 2/2008 | Sabottke et al. |
| 2008/0035572 | A1 | 2/2008 | Sabottke et al. |
| 2008/0071056 | A1 | 3/2008 | Borst |
| 2008/0149561 | A1 | 6/2008 | Chu et al. |
| 2008/0181861 | A1 | 7/2008 | Jiang et al. |
| 2008/0221298 | A1 | 9/2008 | Yamanaka et al. |
| 2008/0234460 | A1 | 9/2008 | Saegusa et al. |
| 2008/0269417 | A1 | 10/2008 | Belfer et al. |
| 2008/0312349 | A1 | 12/2008 | Yeager et al. |
| 2009/0156460 | A1 | 6/2009 | Jiang et al. |
| 2009/0159527 | A1 | 6/2009 | Mickols et al. |
| 2009/0162662 | A1 | 6/2009 | Chang et al. |
| 2009/0197791 | A1 | 8/2009 | Balastre et al. |
| 2009/0266764 | A1 | 10/2009 | Kawakatsu |
| 2010/0006495 | A1 | 1/2010 | Buschmann et al. |
| 2010/0093874 | A1 | 4/2010 | Monin et al. |
| 2010/0216899 | A1 | 8/2010 | Allen et al. |
| 2012/0012527 | A1 | 1/2012 | Allen et al. |
| 2012/0048799 | A1 | 3/2012 | Na et al. |
| 2012/0241373 | A1 | 9/2012 | Na et al. |
| 2013/0327714 | A1 | 12/2013 | Alrasheed et al. |
| 2014/0217014 | A1 | 8/2014 | Na et al. |
| 2014/0353253 | A1 | 12/2014 | Allen et al. |
| 2015/0202575 | A1 | 7/2015 | Na et al. |

FOREIGN PATENT DOCUMENTS

| | | | |
|---|---|---|---|
| IE | 19912781 | A1 | 12/1992 |
| JP | S5824304 | A | 2/1983 |
| JP | 05146655 | | 6/1993 |
| JP | 07171361 | A * | 7/1995 |
| JP | H071713601 | | 7/1995 |
| JP | 07171361 | A | 11/1995 |
| JP | H0810595 | A | 1/1996 |
| JP | 3438278 | | 8/2003 |
| JP | 2007171361 | A | 7/2007 |
| WO | 9962623 | | 12/1999 |
| WO | 2006041115 | A1 | 4/2006 |
| WO | 2006070728 | A1 | 7/2006 |

OTHER PUBLICATIONS

Adi et al, "Facile surface modification of nanofiltration membranes to target the removal of endocrine-disrupting compounds", Journal of Membrane science, 357 (2010) 152-159.

Belfer et al, "Surface modification of commercial composite reverse osmosis membranes", Journal of Membrane Science 139 (1998) 175-181.

Florian et al., "Preparation and Characterization of Novel Solvent-Resistant Nanofiltration Composite Membranes Based on Cross-linked Polyurethanes," Ind. Eng. Chem. Res., vol. 46, No. 14, Jun. 12, 2007, 9 pp.

Guodong Kang et al., "A novel method of surface modification on thin-film composite reverse osmosis membrane by grafting poly-(ethylene glycol)", Polymer 48 (2007) 1165-1170.

Kang et al., "A novel method of surface modification on thin-film composite reverse osmosis membrane by grafting poly( ethylene glycol)," Polymer 48, Elsevier Ltd., Jan. 25, 2007, 6 pp.

La et al., "Novel thin film composite membrane containing ionizable hydrophobes: pH-dependent reverse osmosis behavior and improved chlorine resistance," Journal of Materials Chemistry 20, The Royal Society of Chemistry, Feb. 23, 2010, 6 pp.

Liu et al., "Preparation, structure characteristics and separation properties of thin-film composite polyamide-urethane seawater reverse osmosis membrane," Journal of Membrane Science 325, Elsevier B.V., Sep. 27, 2008, 10 pp.

Liu et al., "Study on a novel polyamide-urea reverse osmosis composite membrane (ICIC-MPD), I. Preparation and characterization of ICIC-MPD membrane," Journal of Membrane Science 281, Elsevier B.V., Mar. 12, 2006, 7 pp.

Mysels et al., "Strength of Interfacial Polymerization Films," Langmuir 1991, vol. 7, American Chemical Society, Jan. 17, 1991, 2 pp.

Na et al., "Thin Film Composite (TFC) Polyamide Membranes Containing Hexafluoroalcohol (HFA) Functionality for Water Desalination," IBM Corporation, 2010, 44 pp.

Nunes et al., "Dense Hydrophilic Composite Membranes for Ultrafiltration," Journal of Membrane Science 106, Elsevier Science B.V., Mar. 13, 1995, 8 pp.

Petersen, "Composite reverse osmosis and nanofiltration membranes," Journal of Membrane Science 83, Elsevier Science Publishers B.V., 1993, 70 pp.

Prosecution History from U.S. Appl. No. 13/491,506, dated Mar. 5, 2015, through Sep. 27, 2016, 94 pp.

Qiu et al., "Preparation of Reverse Osmosis Composite Membrane With High Flux by Interfacial Polymerization of MPD and TMC," Journal of Applied Polymer Science, vol. 112, Wiley Periodicals, Inc., Feb. 13, 2009, 7 pp.

(56) References Cited

OTHER PUBLICATIONS

Riley et al., "Spiral-wound poly( ether/amide) thin-film composite membrane systems," Desalination, 19, Elsevier Scientific Pub. Co., 1976, 15 pp.
Notice of Allowance from U.S. Appl. No. 14/459,593, dated Sep. 23, 2016, 7 pp.
Sagle et al., "PEG-Coated Reverse Osmosis Membranes: Desalination Properties and Fouling Resistance," Journal of Membrane Science 340, Elsevier B.V., May 18, 2009, 17 pp.
Sforca et al., "Composite nanofiltration membranes prepared by in situ polycondensation of amines in a poly (ethylene oxide-b-amide) layer," Journal of Membrane Science 135, Elsevier Science by., May 28, 1997, 8 pp.
Young-Hye La et al., "Novel thin film composite membrane containing ionizable hydrophobes: pH-dependent reverse osmosis behavior and improved chlorine resistance", J. Mater Chem., 2010, 20, 4615-4620.
Prosecution History from U.S. Appl. No. 12/837,148, dated Sep. 19, 2012, through Jun. 10, 2014, 52 pp.

* cited by examiner

COMPOSITE MEMBRANE WITH MULTI-LAYERED ACTIVE LAYER

This application is a Divisional of U.S. application Ser. No. 13/491,506, filed Jun. 7, 2012, the entire content of which is hereby incorporated by reference.

TECHNICAL FIELD

The present disclosure relates to membranes that can be used, for example, in water purification, desalination and gas separation processes. The membranes include an active layer on a support, and the active layer includes at least two chemically distinct crosslinked polyamide film sub-layers.

BACKGROUND

Thin film composite (TFC) membranes including ultrathin active layers and porous supports have been widely used in reverse osmosis (RO) or nanofiltration (NF) processes for desalination. The active layer in a TFC membrane controls separation properties, while the support layer enhances mechanical strength.

The crosslinked aromatic polyamide produced by interfacial polymerization of m-phenylenediamine (MPD) and trimesoyl chloride (TMC) has been a successful commercial product. Although the crosslinked aromatic polyamide TFC membranes show very high salt rejection (>99%) and reasonable water flux (20~55 LMH), the membranes are not sufficiently effective in filtering out harmful toxins such as arsenic and boron, and they also can be sensitive to chemical disinfectants such as chlorine. Chemical attack by disinfectants ultimately results in membrane failure as measured by enhanced passage of both salt and water.

SUMMARY

In one aspect, the present invention is directed to a thin film composite (TFC) membrane construction including an active layer on a support layer. The active layer of the membrane includes at least two chemically distinct crosslinked sub-layers, which are crosslinked at their interface. The first film sub-layer includes a polyamide unit; and the second film sub-layer includes a copolyamide with two chemically distinct polyamide units. The first film sub-layer is closer to the support than is the second film sub-layer.

In another aspect, the present invention is a method of making a thin film composite membrane, including: (A) inserting a support membrane into a first aqueous solution of a diamine (I) to form a diamine (I) treated support membrane; (B) inserting the diamine (I) treated support membrane of step (A) into an organic solution of an acid chloride to form a first active layer on the support membrane; and (C) contacting the first active layer with a second aqueous solution including a diamine (II) and a diamine (III) to form a second active layer on the first active layer.

In another embodiment, the present invention is directed to a method of making a composite membrane, including applying a chemical mixture (A) to a support membrane to form a treated support membrane, wherein the chemical mixture (A) includes an aqueous solution of a monomeric polyamine reactant represented by Formula 1:

Formula 1 wherein R represents an organic group selected from aliphatic, alicyclic, aromatic, heterocyclic groups and combinations thereof, and z represents an integer of 2 or more.

A chemical mixture (B) is applied to the treated support membrane to form a first active layer on the support membrane, wherein the chemical mixture (B) includes an organic solvent and a monomeric polyfunctional acyl halide reactant represented by Formula 2:

Formula 2 wherein $R^1$ represents an organic group selected from the group containing aliphatic alicyclic, aromatic, heterocyclic groups and combinations thereof, X is selected from the group consisting of fluorine, chlorine, bromine and iodine, and p represents an integer of 2 or more.

A chemical mixture (C) is contacted with a surface of the first active layer to form a second active layer overlying the first active layer, wherein the chemical mixture (C) includes an aqueous base, a first monomeric polyamine reactant of Formula 1, and a second monomeric polyamine reactant having one or more hexafluoroalcohol groups represented by Formula 1A:

Formula 1A wherein $R^0$ represents an organic group selected from the group consisting of aliphatic, alicyclic, aromatic, heterocyclic groups and combinations thereof, m is an integer of 2 or more, and n is an integer of 1 or more, and wherein the relative molar ratio of the first monomeric polyamine reactant and the second monomeric polyamine reactant in the chemical mixture (C) is less than 50%, and the weight ratio remains substantially constant as the reaction forming the second active layer proceeds to completion.

In yet another embodiment, the present invention is a thin film composite membrane, including an active layer on a support, wherein the active layer includes at least two chemically distinct first and second crosslinked polyamide films, wherein the second film is a copolyamide that includes an amide moiety that is also included in the first film.

Control of the molar ratio of the first monomeric polyamine reactant to the second monomeric polyamine reactant in the chemical mixture (C) during the formation of the copolyamide in the second active layer can make it possible for the membrane designer to enhance the water flux of the first and the second active layers, to enhance the salt rejection properties of the first and the second active layers, and/or to tailor the performance of the first and the second active layers to treatment of seawater, brackish water, or combined feedwater input stocks.

The multi-level active layer construction may be cost-effectively produced using a sequential interfacial polymerization process.

The details of one or more embodiments of the invention are set forth in the accompanying drawings and the description below. Other features, objects, and advantages of the invention will be apparent from the description and drawings, and from the claims.

DETAILED DESCRIPTION

In one aspect, the present invention is directed to a thin film composite (TFC) membrane construction including an active layer on a support. The active layer of the membrane includes at least two chemically distinct crosslinked sublayers, which are crosslinked at an interface. A first crosslinked polyamide film in the active layer and closest to the support includes an amide moiety, and a second crosslinked polyamide film overlying the first polyamide film is a copolyamide including two different amide moieties. In one embodiment, one of the amide moieties in the second crosslinked polyamide film is the same amide moiety in the first crosslinked polyamide film.

The support layer of the TFC membrane, which underlies the active layer, may vary widely in construction depending on the intended application of the composite membrane. Any ultrafiltration membrane can be used as a support layer for making RO/NF membranes through interfacial polymerization, and polysulfone, polyethersulfone, poly(vinylidene floride), polyetherimide and polyacrylonitrile would be suitable for use with the layered polyamides described herein.

Figure 1:
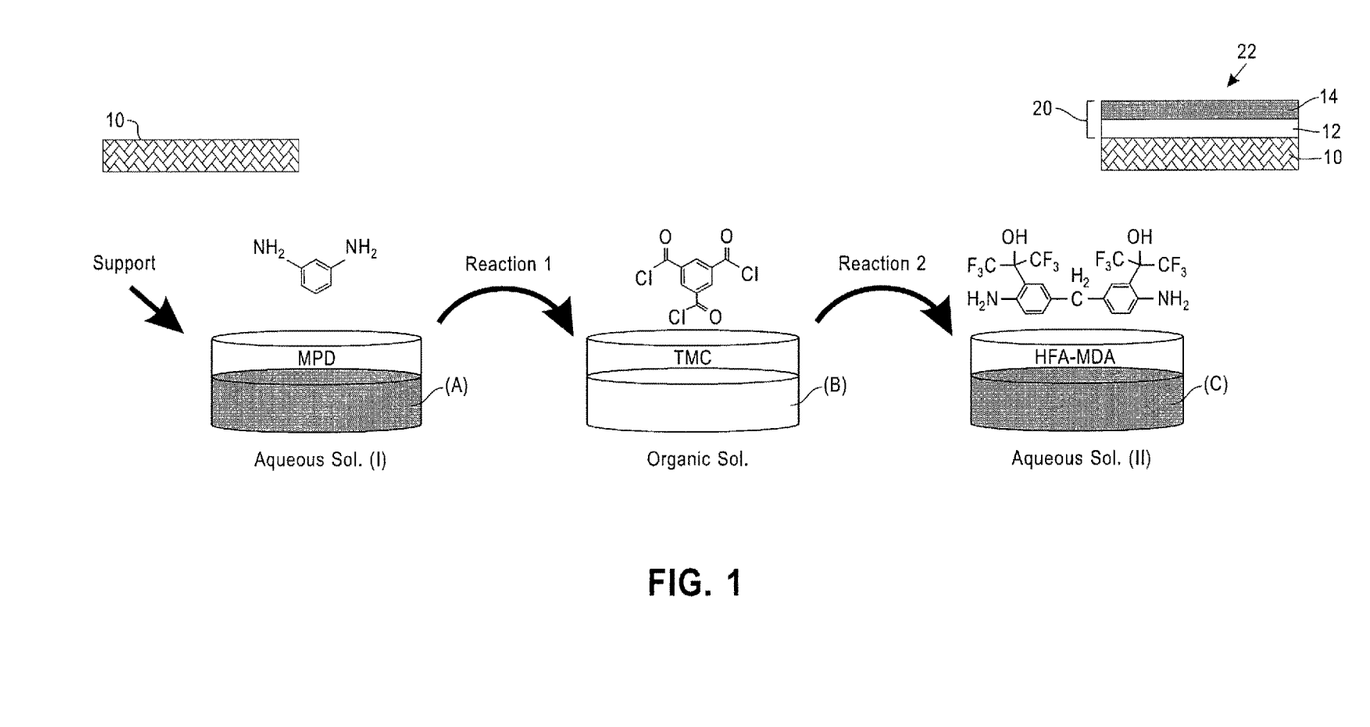
FIG. 1 is a schematic representation of a sequential interfacial polymerization procedure that may be used to fabricate the polyamide TFC membranes described in this disclosure.

The active layer includes at least two chemically distinct crosslinked sublayers, which are crosslinked at their interface. The active layers described herein are readily made using interfacial polymerization methods. In this application the term interfacial polymerization refers to a polymerization reaction that occurs at or near the interfacial boundary of two immiscible solutions. FIG. 1 is a schematic representation of a sequence of interfacial polymerization reactions that may be used to form the active layers of the TFC membrane. However, FIG. 1 represents only an example, and the present invention is not limited to this procedure.

In the embodiment shown in FIG. 1, the first sub-layer 12 of an active layer 20 of the TFC membrane 20 is derived from an interfacial polymerization reaction (Step I IP) between an aqueous chemical mixture (A) and an organic chemical mixture (B) on a support layer 10. The aqueous chemical mixture (A) and the organic chemical mixture (B) are immiscible with each other. When the mixtures (A) and (B) are placed in contact, immiscible means that there is an interface between (A) and (B). The chemical mixtures (A) and (B) can independently be solutions, dispersions, or combinations thereof. Preferably, both (A) and (B) are solutions, and will be referred to in the discussion that follows as solutions.

The aqueous chemical mixture (A) includes a monomeric polyamine reactant represented by Formula 1:

$$R(NH_2)_z \quad \text{Formula 1}$$

wherein R represents an organic group selected from aliphatic, alicyclic, aromatic, heterocyclic groups and combinations thereof, and z represents an integer of 2 or more, 2 to 20, or 2 to 8. In this application, the recitations of numerical ranges by endpoints include all numbers subsumed within that range (e.g., 1 to 5 includes 1, 1.5, 2, 2.75, 3, 3.80, 4, 5, etc.). In some embodiments, R includes an aromatic group, and more preferably consists of one or more aromatic groups.

In some embodiments, R in the monomeric polyamine reactant of Formula 1 represents an organic group with 2 to 30 carbon atoms, or 2 to 20 carbon atoms, or 6 to 20 carbon atoms. For example, R can include an aromatic organic group selected from benzene rings, naphthalene rings, cyclohexane rings, admanthane rings, norbornane rings and combinations thereof. In some embodiments, R in Formula 1 is a benzene ring, and z is equal to 2.

A base can be optionally added to aqueous solution (A) to improve the solubility of the monomeric polyamine reactants of Formula 1. The base used in the aqueous solution (A) may vary widely, and can include an organic base, an inorganic base, and combinations thereof. For example, the base in solution (A) can include inorganic hydroxides, organic hydroxides, carbonates, bicarbonates, sulfides, amines and combinations thereof. Suitable bases include, but are not limited to, NaOH, KOH, Ca(OH)$_2$, Na$_2$CO$_3$, K$_2$CO$_3$, CaCO$_3$, NaHCO$_3$, KHCO$_3$, triethyl amine, pyridine, tetramethylammonium hydroxide and combinations thereof.

The organic chemical mixture (B) includes a monomeric polyfunctional acyl halide reactant, represented by the Formula 2:

$$R^1\text{---}(COX)_p \quad \text{Formula 2}$$

wherein R$^1$ represents an organic group selected from aliphatic, alicyclic, aromatic, heterocyclic groups and combinations thereof, X is a halide selected from fluorine, chlorine, bromine and iodine, and p represents an integer of 2 or more, 2 to 20, or 2 to 8.

In some embodiments, R$^1$ in the polyfunctional acyl halide reactant of Formula 2 represents an organic group with 1 to 30 carbon atoms, or 1 to 20 carbon atoms, or 1 to 15 carbon atoms. In some embodiments, in the polyfunctional acyl halide reactant of Formula 2, R$^1$ can include an organic group selected from benzene rings, naphthalene rings, cyclohexane rings, admanthane rings, norbornane rings and combinations thereof.

In some embodiments, R$^1$ in the polyfunctional acyl halide reactant of Formula 2 represents an organic group represented by Formula 12, Formula 12 wherein W represents an organic group selected from CH$_2$, O, S, C=O, SO$_2$, C(CH$_3$)$_2$, C(CF$_3$)$_2$ and combinations thereof, s represents an integer of 0 or 1, and monovalent COX is chemically bonded to the benzene rings, wherein X is independently selected from fluorine, chlorine, bromine and iodine.

In some embodiments, the monomeric polyfunctional acyl halide reactant in solution (B) includes at least one of a divalent organic compound represented by Formula 10 or a trivalent organic compound represented by Formula 11:

Formula 10

Formula 11 wherein $R^{23}$, $R^{24}$, $R^{25}$, $R^{26}$ and $R^{27}$ are each independently selected from monovalent COX, wherein X is independently selected from fluorine, chlorine, bromine and iodine.

In other embodiments, the monomeric polyfunctional acyl halide reactant in solution (B) includes at least one of a compound selected from a trivalent organic compound represented by Formula 13 or a divalent organic compound represented by Formula 14:

Formula 13

Formula 14 wherein $R^{28}$, $R^{29}$, $R^{30}$, $R^{31}$ and $R^{32}$ are each independently selected from monovalent COX, and X is independently selected from fluorine, chlorine, bromine and iodine, wherein W represents an organic group selected from $CH_2$, O, S, C=O, $SO_2$, $C(CH_3)_2$, $C(CF_3)_2$ and combinations thereof, and wherein s represents an integer of 0 or 1.

In other embodiments, the monomeric polyfunctional acyl halide reactant in solution (B) includes a compound selected from any of the compounds in Formulas 37 through 61, and combinations thereof:

Formula 37

Formula 38

Formula 39

Formula 40

Formula 41

Formula 42

Formula 43

Formula 44

Formula 45

Formula 46

Formula 47

Formula 48

Formula 49

Formula 48

Formula 50

Formula 51

Formula 52

Formula 53

Formula 54

Formula 55

Formula 56

Formula 57

Formula 58

Formula 59

Formula 60

Formula 61

The organic solvent used in the organic solution (B) may vary widely, and can include organic compounds with 1 to 20 carbon atoms, or 1 to 16 carbon atoms, or 1 to 12 carbon atoms. Suitable organic solvents include, but are not limited to, n-hexane, n-heptane, n-octane, n-decane, n-dodecane, carbon tetrachloride, chloroform, dichloromethane, chlorobenzene, xylene, toluene, benzene and combinations thereof.

Optionally, a phase transfer catalyst or surfactant or other additives can be added to solution (A) and/or (B) to enhance reactivity or to improve membrane performance.

The concentration of the monomeric polyamine reactants in the aqueous solution (A) or the acyl halide reactants in the organic solution (B) can vary widely. For example, the concentration of the monomeric polyamine reactants in the aqueous solution (A) can range from 0.01% (w/v) to 20% (w/v), or 0.5% to 10% (w/v), or 1% to 5%. Similarly, the concentration of the acryl halide reactants in the organic solution (B) can range from 0.01% (w/v) to 10% (w/v), or 0.05% to 5% (w/v), or 0.1% to 2%.

The functional groups on the monomeric reactants are selected to provide a crosslinked polymeric reaction product. For example, diamine monomers will always make a crosslinked polyamide by reacting with trimesoyl chloride (TMC). After the interfacially polymerized, crosslinked aromatic polyamide has been formed, its crosslink density can optionally be further increased by post-polymerization reactions with crosslinking or molecular weight-increasing agents such as methane sulfonyl halides, epihalohydrins, trimethylaminesulfur trioxide complex, formaldehyde, glyoxal, and the like.

Referring again to FIG. 1, the crosslinked polyamide layer 12 formed on the support 10 by the reaction between solution (A) and solution (B) includes free acid halide groups that did not react with amines in the initial interfacial polymerization step. These unreacted acid halides eventually hydrolyze to carboxylic acid groups as normally observed at the surface of reverse osmosis (RO) membranes. However, this hydrolysis reaction is relatively slow, and in the present invention a second crosslinked layer 14 is formed on the crosslinked polyamide layer 12 by reacting (FIG. 1, Step II IP) the unreacted acid halides on the surface of the first crosslinked layer 12 with a second aqueous, basic chemical mixture (C). Like the chemical mixtures (A) and (B) above, the chemical mixture (C) can be a solution, a dispersion, or a combination thereof. Preferably, like both chemical mixtures (A) and (B), the chemical mixture (C) is a solution.

The aqueous, basic chemical mixture (C) includes two different aromatic polyamine reactants, which may be the same or different from the aromatic polyamine reactants in chemical mixture (A).

In one embodiment, the two different aromatic polyamine reactants in the chemical mixture (C) may be selected from: (1) an aromatic diamine of Formula 1 above, and (2) a hexafluoroalcohol substituted aromatic diamine of Formula 1A below.

Formula 1A wherein
$R^0$ represents an organic group selected from aliphatic, alicyclic, aromatic, heterocyclic groups and combinations thereof, n represents an integer of 1 or more, 1 to 20, or 1 to 8; and m represents an integer of 2 or more, 2 to 20, or 2 to 8.

In some embodiments, $R^0$ in the monomeric polyamine reactant of Formula 1A represents an organic group with 2 to 30 carbon atoms, or 2 to 20 carbon atoms, or 6 to 20 carbon atoms. For example, $R^0$ can include an aromatic organic group selected from benzene rings, naphthalene rings, cyclohexane rings, admanthane rings, norbornane rings and combinations thereof.

In one embodiment, in the monomeric polyamine reactant of Formula 1A, $R^0$ is an organic group represented by Formula 3:

Formula 3 wherein Y represents an organic group selected from $CH_2$, O, S, C=O, $SO_2$, $C(CH_3)_2$, $C(CF_3)_2$ and combinations thereof, and r represents an integer of 0 or 1. In Formula 3, a monovalent amino ($NH_2$) and a monovalent hexafluoroalkyl [$C(CF_3)_2OH$] group are each chemically bonded to the benzene rings.

In another embodiment, in the monomeric polyamine reactant of Formula 1A, $R^0$ is an organic group represented by Formula 4:

Formula 4 wherein a monovalent amino ($NH_2$) and a monovalent hexafluoroalkyl [$C(CF_3)_2OH$] group are each chemically bonded to the naphthalene rings.

In another embodiment, the monomeric polyamine reactant in aqueous solution (C) includes at least one of a compound selected from a tetravalent organic compound represented by Formula 6 or a trivalent organic compound represented by Formula 7:

Formula 6

Formula 7 wherein $R^2$, $R^3$, $R^4$, $R^5$, $R^6$, $R^7$ and $R^8$ are each independently selected from $NH_2$ and $C(CF_3)_2OH$; wherein Y represents an organic group selected from $CH_2$, O, S, C=O, $SO_2$, $C(CH_3)_2$, $C(CF_3)_2$ and combinations thereof, and wherein r represents an integer of 0 or 1.

In another embodiment, the monomeric polyamine reactant in aqueous solution (C) includes at least one of a compound selected from a tetravalent organic compound represented by Formula 8 or a trivalent organic compound represented by Formula 9:

Formula 8

Formula 9 wherein $R^9$, $R^{10}$, $R^{11}$, $R^{12}$, $R^{13}$, $R^{14}$ and $R^{15}$ are each independently selected from $NH_2$ and $C(CF_3)_2OH$.

In another embodiment, the monomeric polyamine reactant in aqueous solution (C) includes at least one of a compound selected from a trivalent organic compound represented by Formula 10 or a tetravalent organic compound represented by Formula 11,

Formula 10

Formula 11 wherein $R^{16}$, $R^{17}$, $R^{18}$, $R^{19}$, $R^{20}$, $R^{21}$ and $R^{22}$ are each independently selected from $NH_2$ and $C(CF_3)_2OH$.

In other embodiments, the monomeric polyamine reactant in the aqueous solution (C) is represented by any of the Formulas 15 through 36, or combinations thereof:

Formula 15

Formula 16

Formula 17

Formula 18

Formula 19

Formula 20

Formula 21

Formula 22

Formula 23

Formula 24

Formula 25

Formula 26

Formula 27

Formula 28

Formula 29

Formula 30

Formula 31

Formula 32

Formula 33

Formula 34

-continued

Formula 35

Formula 36

The base used in the aqueous solution (C) may vary widely, and can include an organic base, an inorganic base, and combinations thereof. For example, the base in solution (C) can include inorganic hydroxides, organic hydroxides, carbonates, bicarbonates, sulfides, amines and combinations thereof. Suitable bases include, but are not limited to, NaOH, KOH, Ca(OH)$_2$, Na$_2$CO$_3$, K$_2$CO$_3$, CaCO$_3$, NaHCO$_3$, KHCO$_3$, triethyl amine, pyridine, tetramethylammonium hydroxide and combinations thereof.

The relative concentration of the monomeric polyamine reactants in the aqueous solution (C) can vary widely as the reaction in aqueous solution (C) proceeds to completion to form the second crosslinked layer 14, and control over the molar ratio of the first and second polyamine reactants can be controlled to tailor the performance characteristics of the multi-layered active layer 20. For example, in the aqueous solution (C), in some embodiments the molar ratio of the monomeric polyamine reactant of Formula 1A to the monomeric polyamine reactant of Formula 1 can vary from about 20:1 to about 95:1, from about 40:1 to about 90:1, or from about 60:1 to about 85:1. In other embodiments, the molar ratio of the monomeric polyamine reactant of Formula 1 to the monomeric polyamine reactant of Formula 1A is less than about 50%, and in other embodiments the molar ratio of the monomeric polyamine reactant of Formula 1 to the monomeric polyamine reactant of Formula 1A is about 1% to about 25%, or about 1% to about 10%. While not wishing to be bound by any particular theory, presently available data indicate that increasing the amount of the first polyamine reactant of Formula 1 in the aqueous solution (C) reduces the water flux and increases the salt rejection of the multi-layered active layer 20 for both brackish water and seawater feed solutions.

To ensure that the RO performance (water flux and salt rejection) of the active layer 20 is more predictable and reproducible, the molar ratio between the polyamine reactant of Formula 1 and the polyamine reactant of Formula 1A in solution (C) should preferably be substantially constant as the reaction proceeds to completion and the second crosslinked layer is formed. If the molar ratio between two different reactants in solution (C) changes substantially, the composition of the resulting active layer 20 will change, and consequently, RO performance will vary. For example, in some embodiments the molar ratio between the polyamine reactant of Formula 1 and the polyamine reactant of Formula 1A should vary no more than about 10%, or no more than about 5%, or no more than about 1%.

The resulting membrane active layer 20 includes two crosslinked sub-layers 12 and 14, which are crosslinked at their interface. The first sub-layer 12 closest to the support includes a polyamide unit, while the second sub-layer 14 on the first sub-layer 12 is a copolyamide including two different, chemically distinct polyamide units. In some embodiments, one of the polyamide units in the copolyamide in the second sub-layer 14 is the same polyamide unit found in the first sub-layer 12. In other embodiments, the sub-layers 12 and 14 may have no common polyamide units.

In one embodiment, for example, to fabricate the multi-layered polyamide membranes, a support membrane 10 (FIG. 1) may be contacted with a first aqueous solution (A) containing a polyamine reactant of Formula 1 such as MPD, and an organic solution (B) containing an acid halide of Formula 2 such as TMC, to form the first crosslinked sub-layer 12 on the support membrane 10. The first crosslinked sub-layer 12 is then contacted with a second aqueous solution (C) containing two different polyamine reactants, a polyamine reactant selected from Formula 1 and a polyamine reactant selected from Formula 1A. For example, in one embodiment, one of the polyamine reactants in the second aqueous solution (C) may be the same polyamine reactant of Formula 1 as was used in the first aqueous solution (A). In other embodiments, the second aqueous solution (C) may include a polyamine reactant of Formula 1 that is not found in the first aqueous solution (A). In one example, the second aqueous solution (C) may include MPD and HFA-MDA.

In this sequential interfacial polymerization process, the contamination of the second aqueous solution (C) by the first polyamine reactant transferred from the previous reaction baths (A) and (B) can cause variation in the performance of the resulting multi-layered polyamide membranes. For example, if the membranes are made using a roll-to-roll process, the RO performance at the end of the roll could be completely different from that at the starting roll due to the accumulated diamine-contaminant at in the second aqueous solution (C). However, if the ratio of the polyamine reactants is substantially maintained at an appropriate level in the second aqueous solution (C), the present inventors have discovered that the RO performance of the resulting multi-layered membrane active layer 20 can be tailored for a selected feedwater input stream.

As noted above, in the embodiment shown in FIG. 1 the solution in the second aqueous solution (C) includes both the aromatic polyamine reactants of Formula 1 (for example, MPD), and the hexafluoroalcohol substituted aromatic polyamine reactants of Formula 1A (for example, HFA-MDA and HFA-ODA). A first aromatic polyamine monomeric reactant derived from the diamines of Formula 1 and a second aromatic polyamine monomeric reactant derived from the hexafluoroalcohol substituted diamines of Formula 1A compete for reaction with the unreacted halide groups on the aromatic acid halides (for example, trimesoyl chloride (TMC)) on the surface of the sub-layer 12. The competing aromatic polyamine reactants in the second aqueous solution (C) react to form the crosslinked copolymer sub-layer 14, which includes both the amide moieties derived from the polyamine reactants.

The resulting active layer 20 includes a first crosslinked polyamide film 12 adjacent to the support 10 and includes an amide moiety derived from the aromatic diamines of Formula 1 present in the first aqueous solution. The active layer further includes a second crosslinked polyamide film 14 overlying and crosslinked with the first polyamide film 12. The crosslinked polyamide film 14 includes a copolymer formed from a blend of the amide moieties derived from the diamines present in the second aqueous solution. In one embodiment, the diamines in the second aqueous solution are derived from the aromatic diamines of Formula 1 and the second hexafluoroalcohol substituted aromatic diamines of Formula 1A. In some embodiments, the layers 12 and 14 can both include a common amide moiety derived from the aromatic diamine of Formula 1, but such a construction is not required. The top surface of the copolymer layer 14 includes unreacted free amines because the interfacial polymerization occurs in an excess amine solution having a limited amount of acid chlorides available for reaction.

In another embodiment, the present invention is a method for making a TFC membrane including a multi-layered active layer on a support. Referring again to the non-limiting example process shown in FIG. 1, one embodiment for making the multi-layered active layer will be discussed in more detail, which is not intended to be limiting. In this embodiment, the pre-treated support membrane 10 is placed in the first aqueous solution (A), which includes a polyamine reactant of Formula 1, for several minutes, typically about 1 minute to about 5 minutes.

Excess solution is drained from the dip-coated surface of the support membrane 10 (or excess solution is removed by rolling with rubber roller) and the coated support membrane 10 is optionally dried for about 1 minute to about 10 minutes in air at room temperature.

The diamine saturated support membrane 10 is then immersed in solution (B), which contains an acid halide of Formula 2. After about 1 minute of reaction, the first active membrane layer 12 is formed on the support 10.

The construction including the active membrane layer 12 is then contacted with the second aqueous solution (C), which contains at least two polyamine reactants, a reactant of Formula 1 and a reactant of Formula 1A. The active layer 12 and the second aqueous solution (C) are contacted in a manner that maintains the desired monomeric ratio of the polyamine reactant of Formula 1 to the polyamine reactant of Formula 1A on the surface of the active membrane layer 12. Suitable contact methods include, but are not limited to, pouring or spraying the solution (C) on the surface of the first active membrane layer 12, or dipping the first active membrane layer 12 into the solution (C). The period of contact between the first active membrane layer 12 and the solution (C) is about 1 minute to about 10 minutes, and in some embodiments is about 5 minutes. The construction including the active membrane layer 12 and the support 10 may optionally be dried before contacting the active membrane layer 12 with the aqueous solution (C).

After about 1 minute to about 10 minutes of reaction, typically about 5 minutes, the second active membrane layer 14 is formed on the first active membrane layer 12, resulting in the multi-layered composite membrane active layer 20.

The multi-layered composite membrane 22 may then optionally be dried. The drying conditions can vary widely, but in some embodiments the membrane 22 is dried about 1 minute to about 5 minutes in air at room temperature, or optionally in an oven maintained at a temperature of about 30° C. to about 70° C. for about 1 minute to about 5 minutes.

The membrane 22 may optionally be rinsed with, for example, 0.2% (w/w) sodium carbonate solution for approximately 5 min and stored in water prior membrane testing.

The active layer 20 of the membrane 22 preferably has a thickness of less than about 1 micron, and in some embodiments may have a thickness of less than about 500 nanometers.

Chemical or physical treatments (plasma or UV-ozone) can be optionally used to increase the hydrophilicity of a surface of the support membrane 10, prior to introducing the support membrane 10 into the solution (A). While not wishing to be bound by any theory, presently available evidence indicates that plasma and/or UV-ozone treatment of a polysulfone support generates a more hydrophilic surface (complete wetting by water), so it can enhance the density of the coverage of the polyamide monomer on the support layer.

Additional structural integrity can optionally be provided for the composite membrane 22 by laminating the composite 22 to a second support film or layer (not shown in FIG. 1). The second support film or layer is preferably a flexible, porous, organic polymeric material that can be fibrous in nature if desired. An example of a fibrous backup or support material is a paper-like web of spun-bonded polymeric (e.g., polyethylene) fibers having diameters in the micrometer range.

Flat sheet-type (for example, spiral wound-type) water purification or permselective modules utilizing the composite membranes 22 described herein are useful for applications such as, for example, desalination of seawater, brackish water desalting, whey concentration, electroplating chemical recovery, softening of hard water for municipal or home use, boiler feed water treatment, and other water treatments which involve removal of a solute or contaminant.

The present invention will now be described with reference to the following non-limiting examples.

EXAMPLES

Reagents and Supplies 3,3'-Bis(1-hydroxy-1-trifluoromethyl-2,2,2-trifluoro-ethyl)-4,4'-methylene-dianiline (HFA-MDA) was provided by Central Glass, Inc. (Japan) and used as received. Methods for making these flourine-containing monomers are described in, for example, U.S. Pat. No. 7,629,434 to Saegusa et al., which is incorporated herein by reference.

m-Phenylene diamine (MPD flakes, >99%) and trimesoyl chloride (TMC, 98%)), sodium arsenate ($Na_2HAsO_4.7H_2O$, 99%), and arsenic (III) oxide ($As_2O_3$, >99.5%) were purchased from Sigma-Aldrich, and the TMC was distilled before use.

Sodium chloride (NaCl), sodium hydroxide (NaOH, pellets) and sodium carbonate ($Na_2CO_3$) were purchased from J. T. Baker.

Hexane was purchased from Omni Solv. Deionized water was used for all experiments.

Polysulfone (PSF) ultrafiltration (UF) membranes were purchased from Sepro Membranes, Inc.

Example 1: Fabrication of Reference Polyamide Membranes (Ref)

A reference polyamide TFC membrane, referred to herein as Ref, was synthesized on a pre-formed polysulfone (PSF) ultrafiltration membrane by single-step interfacial polymerization. The PSF membrane was placed in an aqueous solution of 2% (w/v) MPD for 2 min, and the MPD soaked support membrane was then rolled with a rubber roller to remove excess solution. MPD saturated membrane was then immersed in a solution of 0.1% (w/v) trimesoyl chloride (TMC) in hexane. After 1 min of reaction, the resulting membrane was rinsed with an aqueous solution of 0.2% (w/v) sodium carbonate for 5 min and stored in pure water until the membrane is evaluated. (Average water flux: 40±2 LMH, salt rejection: 97.5±1.6% at the conditions for brackish water filtration)

Example 2: Fabrication of Layered Polyamide Membranes (4 Coupons) with Same Solution Baths: Study on the Effect of MPD Accumulation at 2" Aqueous Solution Four coupons of layered polyamide membranes were fabricated by sequential interfacial polymerization (see FIG. 2A) with the same solution baths in serial order. A preformed polysulfone (PSF) ultrafiltration support membrane was placed in an aqueous solution of 2% (w/v) MPD (referred to in FIG. 2A as Aqueous solution (I)) for 2 min, and the MPD soaked support membrane was then rolled with a rubber roller to remove excess solution. The MPD saturated membrane was then immersed in a solution of 0.1% (w/v) trimesoyl chloride (TMC) in hexane. After 1 min of reaction, the resulting membrane was dried and placed in a second aqueous basic solution of 2% (w/v) HFA-MDA diamine (referred to in FIG. 2A as Aqueous solution (II)) for 2 min (2 eq. of NaOH was added to completely dissolve the HFA-MDA monomer), rinsed with an aqueous solution of 0.2% (w/v) sodium carbonate for 5 min, and stored in pure water. The corresponding RO performance and XPS data of the four coupons were summarized in FIG. 2 and Tables 1-2 below. (Average water flux: 32±7 LMH, salt rejection: 99.3±0.4% at the conditions for brackish water filtration)

Table 1 below shows the x-ray photoelectron spectroscopy (XPS) fluorine concentration (F(1s)) and atomic ratio (F/C) of the layered polyamide membranes fabricated as described in Example 2 above. The data designated (a) in Table 1 were not acquired. As shown in Table 1, both F(1s) and F/C gradually decreased as the i-phobe 2 fabrication order moved from $1^{st}$ to $4^{th}$.

TABLE 1

| i-phobe 2 (fabrication order) | F(1s) | F/C |
|---|---|---|
| $1^{st}$ | 17.1 | 0.27 |
| $2^{nd}$ | (a) | (a) |
| $3^{rd}$ | 13.3 | 0.21 |
| $4^{th}$ | 12.8 | 0.20 |

Figure 2A:
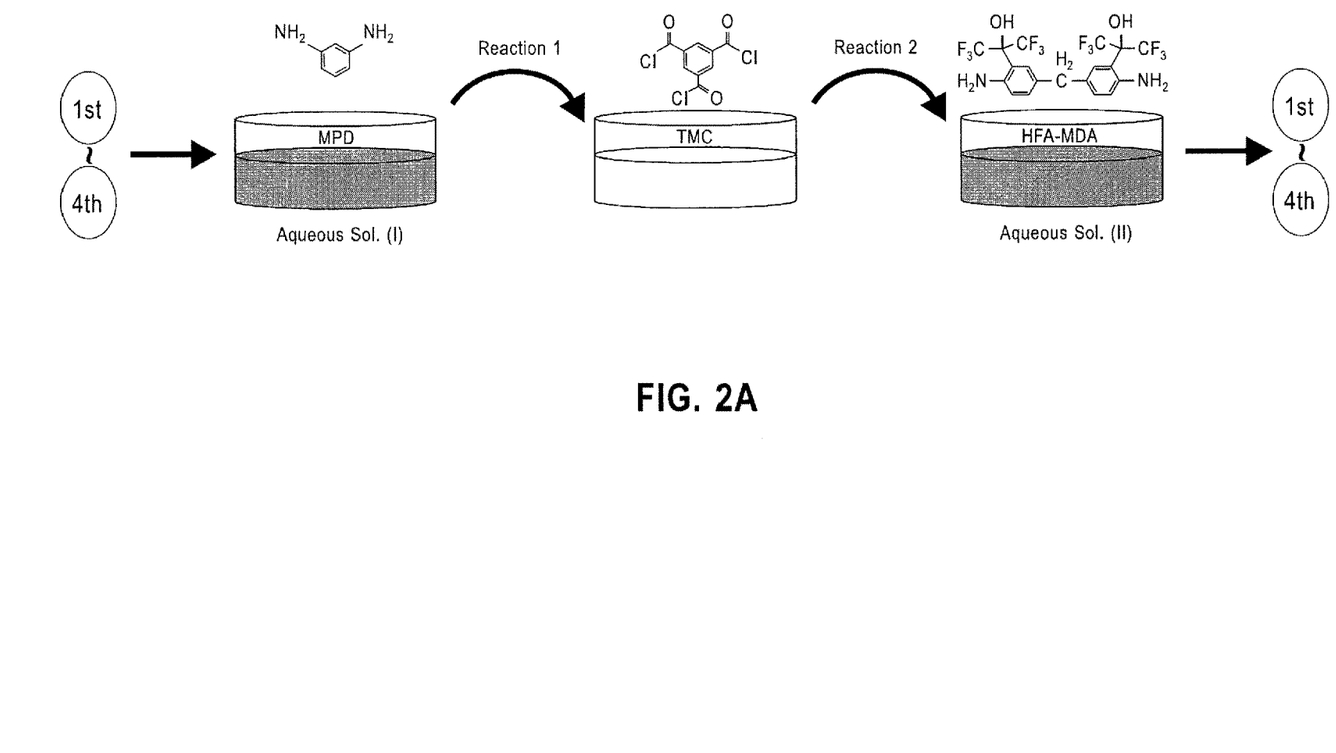
FIG. 2A is a schematic drawing showing the sequential interfacial polymerization membrane fabrication process of Example 2.
Figure 2B:
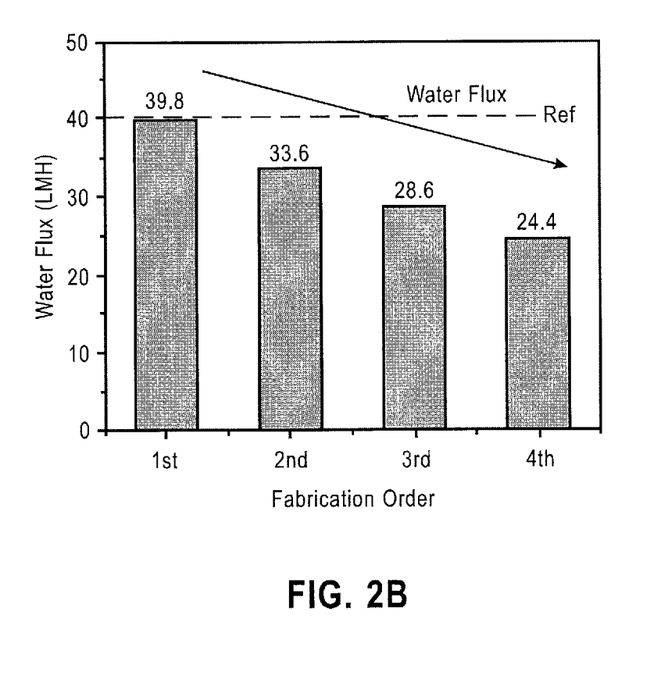
FIGS. 2B and 2C are plots showing the trend of water flux and salt rejection, respectively, versus the membrane fabrication order.
Figure 2C:
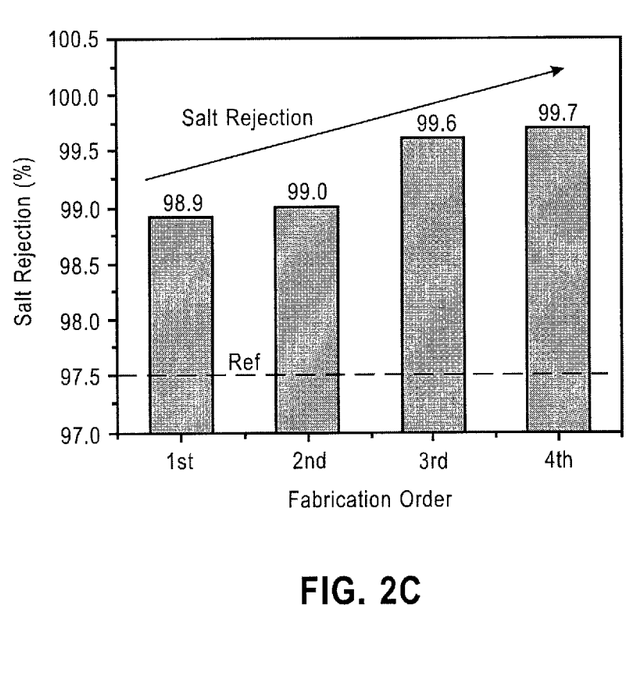

The plots in FIGS. 2B and 2C further illustrate that water flux decreases as MPD contamination in Aqueous solution (II) increases (from 1st sample towards 4th sample in Example 2), while salt rejection slightly increases. The green dashed lines indicate the water flux and salt rejection of reference polyamide (a single layer polyamide made with MPD and TMC by reaction 1 only).

Figure 3A:
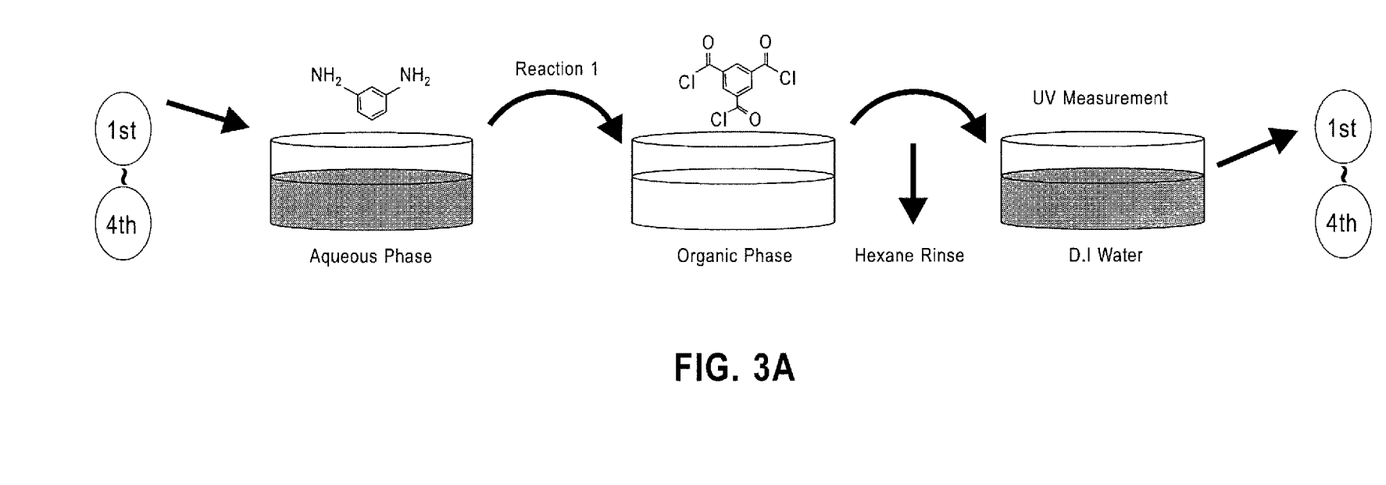
FIG. 3A is a schematic representation showing the experimental procedure used in Example 2 to prove MPD monomer leaching.

To confirm MPD leaching in the second aqueous solution and to define how much MPD monomer was transferred from the previous reaction baths in Example 2, four sample coupons of a reference polyamide membrane were synthesized on pre-formed polysulfone (PSF) support membranes by single step interfacial polymerization as described in Example 1 (FIG. 3A). The membrane coupons were then immersed into pure water for 2 minutes in serial order, and the chemical (water soluble, unreacted MPD molecules) leaching from the membranes was monitored by measuring UV-intensity of the water solutions right after dipping each sample coupon. The approximate concentration of MPD monomers transferred from the previous solutions was calculated by using the Beer-Rambert equation (molar absorption coefficient ($\varepsilon$) of MPD=2281.3 L mol$^{-1}$ cm$^{-1}$ (FIG. 3B).

Figure 3B:
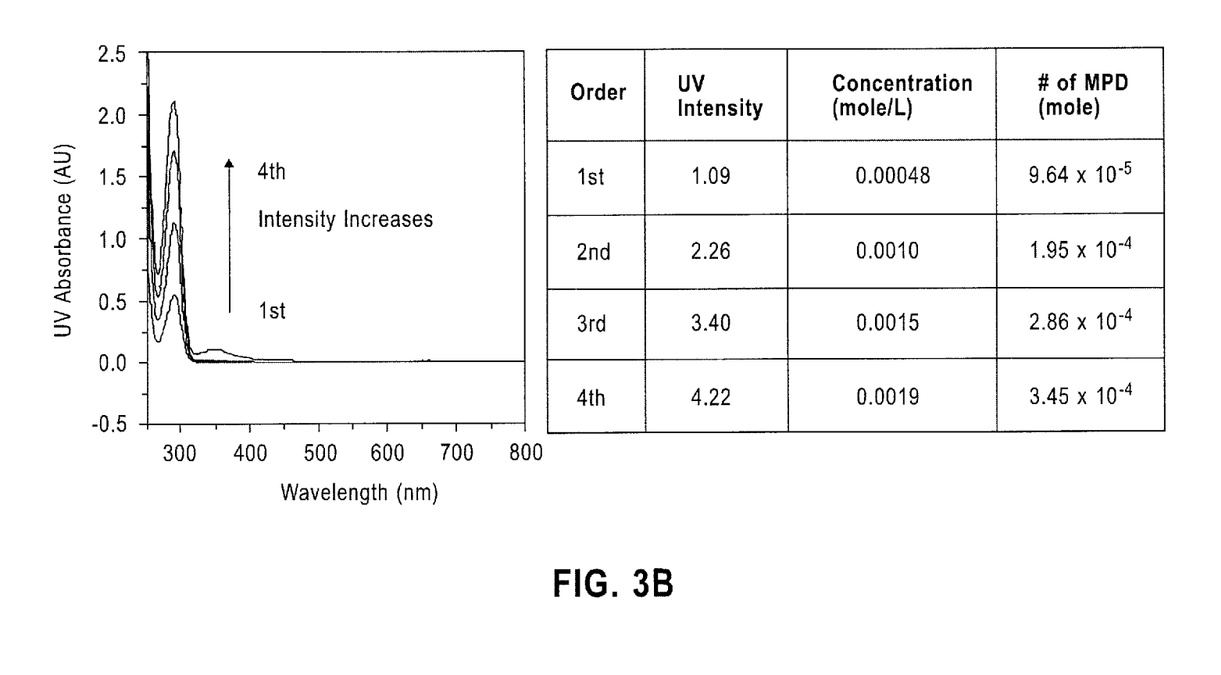
FIG. 3B includes a plot and a table showing the UV intensities of water samples collected after dipping the four membranes of Example 2 (1st-4th coupons) in serial order.

As shown in FIG. 3B, a strong absorption peak near 290 nm was observed from the water solution and the UV intensity increased proportionally by dipping the four membrane coupons in serial order. This result clearly proves that unreacted MPD monomers carried over from the previous reaction step dissolved and accumulated in the second aqueous solution. From the UV intensity values, we can easily calculate exact amount of MPD molecules accumulated in the second aqueous solution (see Table in FIG. 3B) after each membrane dipping, and these data can be utilized to estimate an approximate molar ratio between HFA-MDA monomers and MPD monomers involved in the second interfacial polymerization for each sample coupon described in Example 2 and FIG. 2.

Table 2 below shows the estimated molar ratio between HFA-MDA and MPD involved in the second interfacial polymerization (Aqueous solution (II)) for each sample coupon in Example 2 ($1^{st}$, $2^{nd}$ $3^{rd}$ and $4^{th}$) shown in FIG. 2A, and the corresponding RO performance.

TABLE 2

| Membrane coupon | Estimated molar ratio (HFA-MDA:MPD) | RO performance (Brackish water filtration) | | RO performance (Seawater filtration) | |
|---|---|---|---|---|---|
| | | Water Flux | Salt Rejection | Water Flux | Salt Rejection |
| $1^{st}$ | 78.5:1 | 39.8 | 98.9 | 29.4 | 99.4 |
| $2^{nd}$ | 37.7:1 | 33.6 | 99.0 | 24.8 | 99.4 |
| $3^{rd}$ | 25.1:1 | 28.6 | 99.6 | 21.4 | 99.5 |
| $4^{th}$ | 19.8:1 | 24.4 | 99.7 | 19.2 | 99.6 |

As shown in Table 2, when the molar ratio between HFA-MDA and MPD reaches about 25:1 in the second aqueous solution (Aqueous solution (II) in FIG. 2A), the salt rejection of the layered polyamide membrane ($3^{rd}$ sample coupon) increased up to more than 99.5% for both brackish filtration and seawater filtration although water flux slightly decreased.

Figure 4:
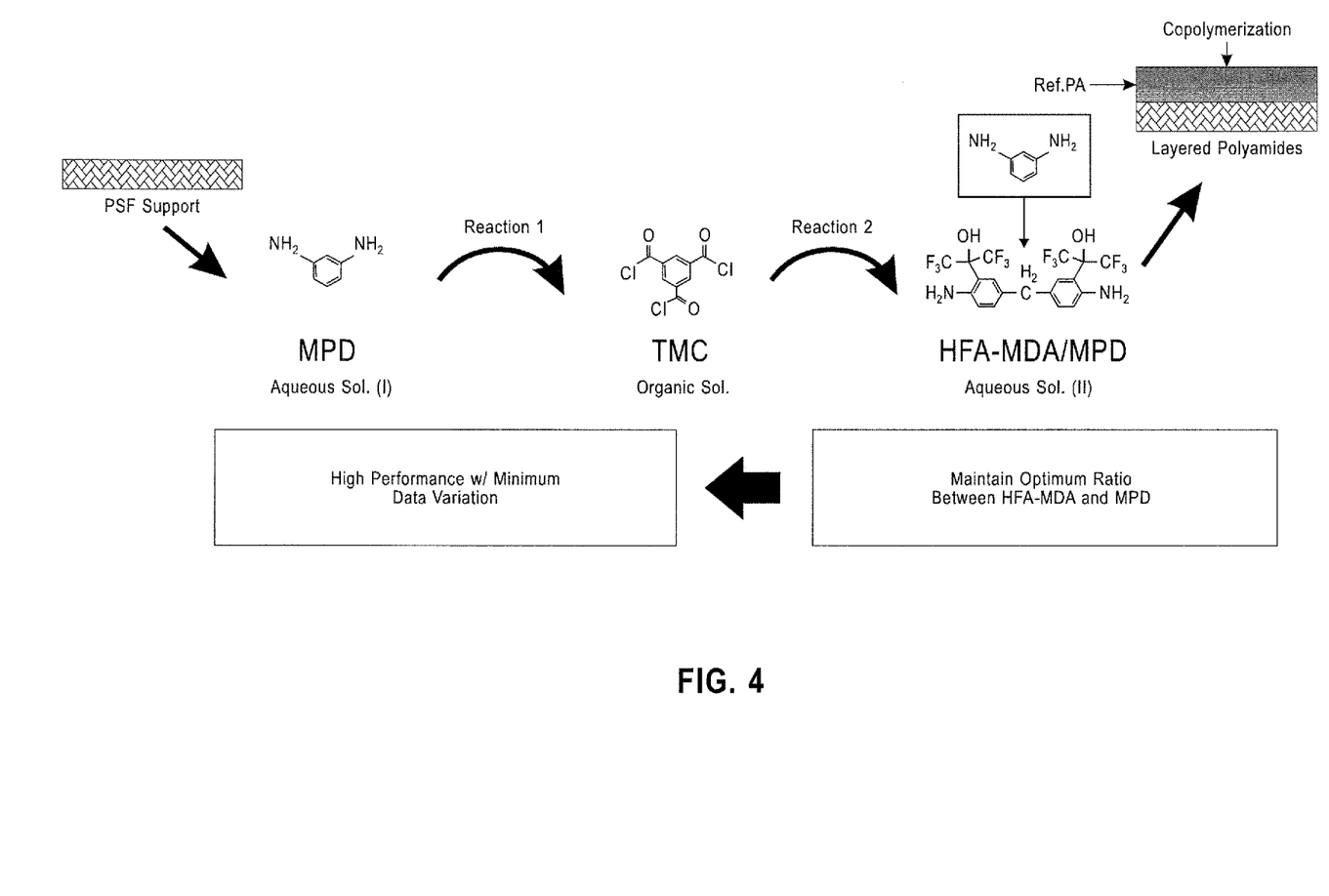
FIG. 4 is a schematic representation showing the presently described method to prepare high performance layered polyamide RO membranes using a copolymerization approach in the second reaction.

This approach opens up a simple way to tune the performance of layered polyamide membranes synthesized by sequential interfacial polymerization as well as to minimize performance variation caused by the system contamination. For example, high performance RO membranes could be fabricated very consistently by retaining a selected molar ratio between the first and the second diamine monomers (HFA-MDA and MPD) over a whole reaction period (FIG. 4).

Example 3: Fabrication of Layered Polyamide Membranes (Four Coupons) with a Fresh HFA-MDA Solution: Consistent Reaction Conditions for Each Coupon To minimize MPD contamination and accumulation at the $2^{nd}$ aqueous solution, four coupons of layered polyamide membrane were fabricated by using a fresh HFA-MDA solution ($2^{nd}$ aqueous solution) each time while following the process described in Example 2. Since one membrane coupon (4 inch×5 inch) releases approximately 0.00048 mole/L of MPD in the $2^{nd}$ aqueous solution containing 0.038 mole/L of HFA-MDA, it is expected that each coupon was fabricated under the $2^{nd}$ aqueous solution containing almost 79:1 molar ratio of HFA-MDA and MPD monomers. RO performance and XPS fluorine content (F(1s): 17.1±1.7) of these four sample coupons were quite consistent, irrespective of fabrication order (no flux reduction trend). (Average water flux: 39±3 LMH, salt rejection: 99.2±0.5% at the conditions for brackish water filtration)

Example 4: Membrane Evaluation

Membrane performance was evaluated using a crossflow filtration system at 25° C. (cross-flow rate: 1 gallon per minute (GPM)). For brackish water filtration, all membrane coupons were compressed by circulating deionized water for 3 hours at 400 pounds per square inch (psi). The salt rejection and water flux was then measured with 2000 ppm aqueous solution of NaCl at the same pressure. For seawater filtration, membrane coupons were compressed under 800 psi for 3 hours by circulating deionized water and the salt rejection and water flux was measured with 35000 ppm aqueous solution of NaCl at 800 psi.

Various embodiments of the invention have been described. These and other embodiments are within the scope of the following claims.

The invention claimed is:

1. A thin composite membrane, comprising:
an active layer on a support membrane, wherein the active layer comprises at least two chemically distinct first and second crosslinked polyamide film sub-layers, wherein:
the first film sub-layer comprises a polyamide unit; and
the second film sub-layer comprises a copolyamide comprising two chemically distinct polyamide units, and the first film sub-layer is closer to the support than is the second film sub-layer.

2. The thin film composite membrane of claim 1, wherein one of the two chemically distinct polyamide units in the second film sub-layer is the same as the polyamide unit in the first film sub-layer.

3. The thin film composite membrane of claim 1, wherein the first film sub-layer comprises a first crosslinked, aromatic polyamide derived from a diamine (I); and the second film sub-layer is on the first film sub-layer, and the second film sub-layer comprises a second cross-linked aromatic copolyamide derived from two chemically distinct diamines, diamine (II) and diamine (III).

4. The thin film composite membrane of claim 3, wherein the diamine (II) is the same as the diamine (I).

5. The thin film composite membrane of claim 4, wherein the first film sub-layer comprises a first crosslinked, aromatic polyamide derived from m-phenylenediamine; and the second film sub-layer comprises a second cross-linked aromatic copolyamide derived from both m-phenylenediamine and an HFA-substituted aromatic diamine.

6. A thin film composite membrane, comprising:
an active layer on a support, wherein the active layer comprises at least two chemically distinct first and second crosslinked polyamide films, wherein the second film is a copolyamide that includes an amide moiety that is also included in the first film.

7. The thin film composite membrane of claim 6, wherein the active layer comprises:
a first film on the support, wherein the first film comprises a first crosslinked, aromatic polyamide derived from a diamine (I); and
a second film on the first film, wherein the second film comprises a second cross-linked aromatic copolyamide derived from a mixture of the diamine (I) and a diamine (II), wherein the diamine (II) is chemically distinct from the diamine (I).

8. The thin film composite membrane of claim 7, wherein the first film comprises a first crosslinked, aromatic polyamide derived from m-phenylenediamine; and the second film comprises a second cross-linked aromatic copolyamide derived from m-phenylenediamine and hexafluoroalcohol (HFA)-substituted aromatic diamine.

* * * * *